(12) United States Patent
Diaz et al.

(10) Patent No.: US 8,332,144 B2
(45) Date of Patent: Dec. 11, 2012

(54) IMAGE CORRECTION METHOD AND APPARATUS FOR NAVIGATION SYSTEM WITH PORTABLE NAVIGATION UNIT

(75) Inventors: Melvin Bernard Diaz, La Palma, CA (US); Tsutomu Tommy Ogawa, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 749 days.

(21) Appl. No.: 11/642,206

(22) Filed: Dec. 20, 2006

(65) Prior Publication Data
US 2007/0203646 A1    Aug. 30, 2007

Related U.S. Application Data

(60) Provisional application No. 60/755,553, filed on Dec. 31, 2005.

(51) Int. Cl.
*G01C 21/00* (2006.01)

(52) U.S. Cl. ........ 701/455; 701/400; 701/456; 701/457; 701/459; 701/432

(58) Field of Classification Search .................. 701/209, 701/211, 213, 212, 36, 208, 200; 340/990; 382/282, 276
See application file for complete search history.

(56) References Cited

U.S. PATENT DOCUMENTS

| | | | | |
|---|---|---|---|---|
| 4,894,646 A * | 1/1990 | Ryman | | 345/556 |
| 5,267,248 A * | 11/1993 | Reyner | | 714/736 |
| 6,381,360 B1 * | 4/2002 | Sogawa | | 382/154 |
| 6,427,115 B1 * | 7/2002 | Sekiyama | | 701/208 |
| 6,674,799 B2 * | 1/2004 | Rhee | | 375/240.21 |
| 6,714,253 B2 * | 3/2004 | Kim et al. | | 348/556 |
| 2003/0043303 A1 * | 3/2003 | Karuta et al. | | 348/744 |
| 2004/0248543 A1 * | 12/2004 | Itsukaichi | | 455/345 |
| 2005/0197745 A1 * | 9/2005 | Davis et al. | | 701/1 |

FOREIGN PATENT DOCUMENTS

JP    07-143419    6/1995

* cited by examiner

*Primary Examiner* — Khoi Tran
*Assistant Examiner* — Bhavesh V Amin
(74) *Attorney, Agent, or Firm* — Muramatsu & Associates

(57) ABSTRACT

The image correction method and system for navigation device with portable navigation unit converts an image based on projection to a first display into a suitable image on a second display such that the area of the second display is used economically and efficiently while maintaining some elements of the image in substantially common aspect ratio between the images on the first display and on the second display. The image correction method determines the ratio of the second display, determines if image correction is required, and checks a correction table and performs image correction according to correction rules to generate the corrected image for projecting on the second display.

17 Claims, 15 Drawing Sheets

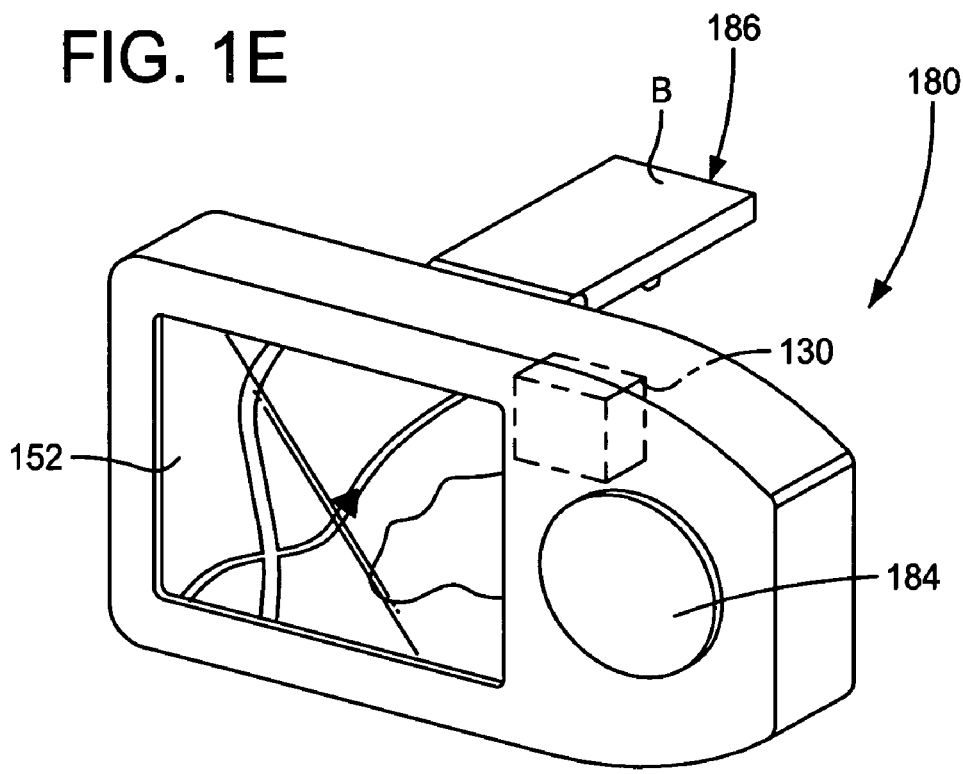
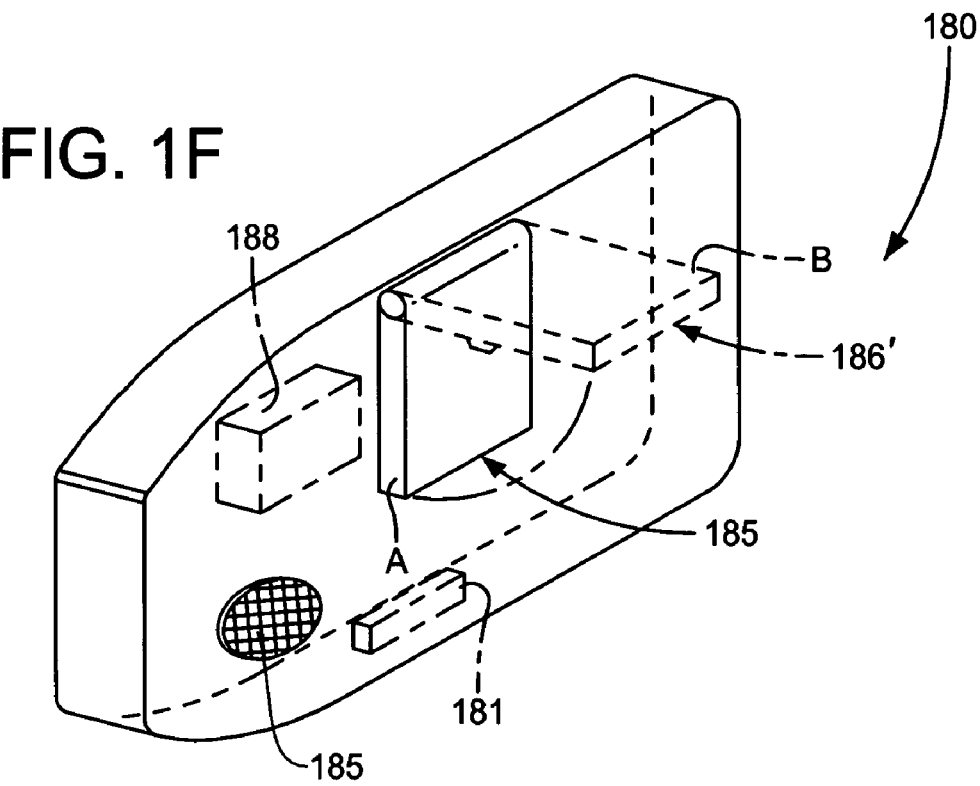

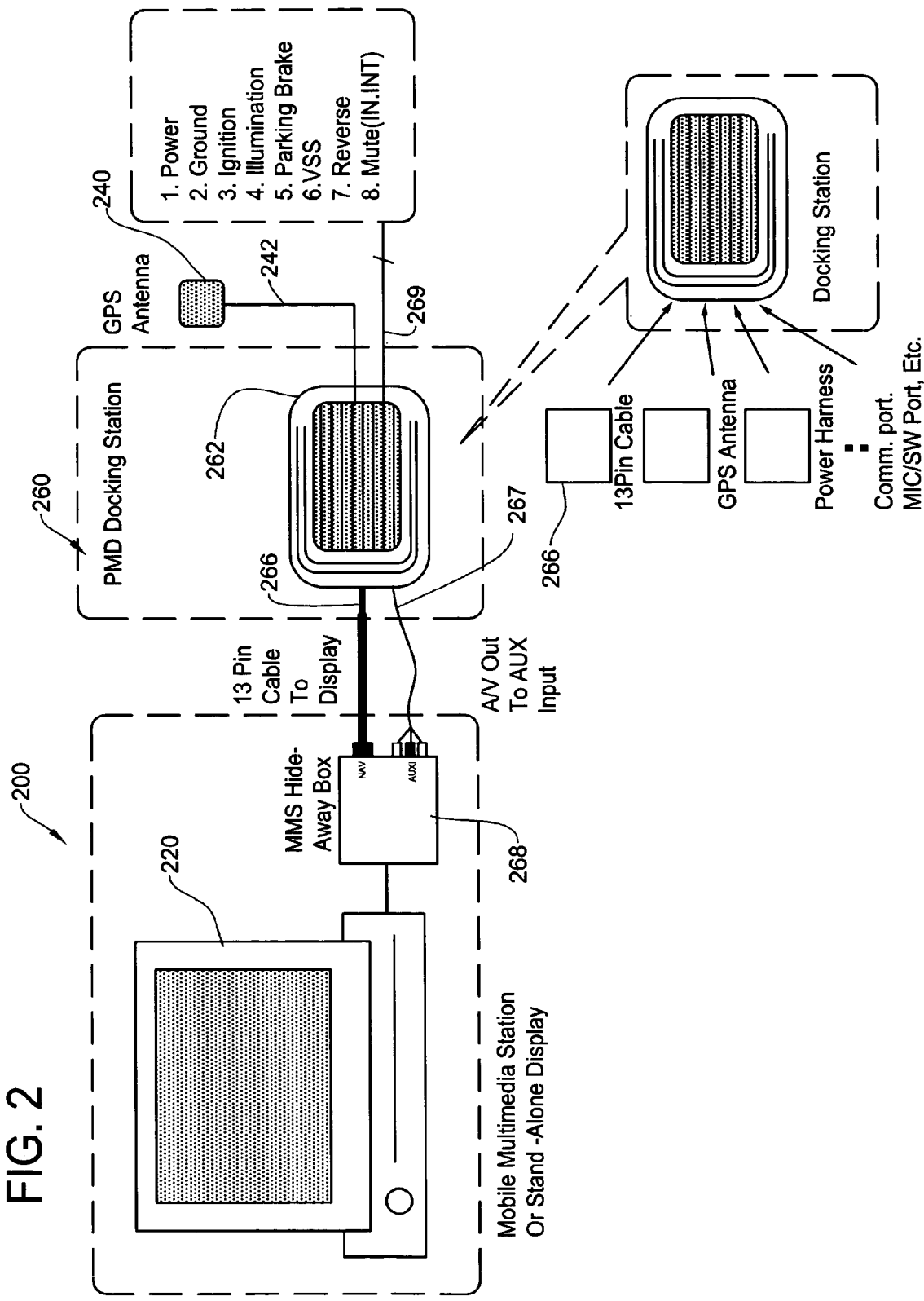

FIG. 3

| Pin No. | Pin Name | Use | I/O | Specification | Notes |
|---|---|---|---|---|---|
| 1 | Audio GND | Ground for Audio | - | GND Level. | |
| 2 | Video GND | Ground for Video | - | GND Level. | |
| 3 | Audio (Mono) | Outputs Voice Guidance | O | 800*100 [mVrms] | Buzzer output 85±10mVrms |
| 4 | Guide Control | This port changes to Hi level when a voice guidance prompt is announced. | O | Hi: 5V/ Low: 0V | Those for Europe are inverse logic. |
| 5 | Video (NTSC) | Outputs video signal (NTSC). | O | 2.0±0.2 [Vp-p] | It is 1.0Vp-p when carrying out a terminus by 75Ω. |
| 6 | Remote | Receives remote controller's signal from Alpine display. | I | Low level detect: 2V/1mA | |
| 7 | Disp. Cont. | Hi level is outputted in order to tell having connected with Navi to Alpine display. When having connected with a touch panel display, it is used as a TX port for touch panels. | O | Hi: 5V/ Low: 0V | Those for all areas are same logic. |
| 8 | R | Red signal. | O | 0.7±0.2 [Vp-p] | Terminus: 75Ω |
| 9 | B | Blue signal. | O | 0.7±0.2[Vp^] | Terminus: 75Ω |
| 10 | NTSC / RGB | When outputs RGB signal, outputs Hi level. | O | Hi: 5V/ Low: 0V | For navi mpage output judgment. |
| 11 | WIDE / NORMAL | Receives display's aspect ration, If display's aspect ratio is 16:9, receives Hi Level. If it is 4:3, receives Low Level. When having connected with a touch-panel display, it is used as a RX port for touch panels. | I | Hi: 5V/ Low: 0V | |
| 12 | C. Sync. | Negative logic synchronization signal. | O | Hi: 5V/ Low: 0V | |
| 13 | G | Green signal. | O | 0.7±0.2 [Vp-p] | Terminus: 75Ω |

100
IMAGE CORRECTION METHOD AND APPARATUS FOR NAVIGATION SYSTEM WITH PORTABLE NAVIGATION UNIT

This application claims the benefit of U.S. Provisional Application No. 60/755,553 filed Dec. 31, 2005.

FIELD OF THE INVENTION

This invention relates generally to an image correction method and system for navigation device with portable navigation unit, and more particularly, to an image correction method and system that converts an image from the portable navigation unit to an external display so as to give aesthetic appearance and map elements that is close to the original image even when the display size, shape and aspect ratio of the external display are different from the display of the portable device.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. In recent years, the use of both mobile media and navigation systems in a vehicle has become increasingly more common. Because of data storage requirements, such systems were initially somewhat bulky and required that the systems be permanently installed in the vehicle. However, more recently developed devices are sufficiently compact to allow them to be personally portable and be temporarily mounted within the vehicle. This gives the user the option to use the device both inside and outside of the vehicle.

To have the navigation display visible to the driver when such devices are used within a vehicle, the portable device is either, held by the driver or a passenger, propped up against the interior structure of the vehicle, or otherwise attached to a device mount. Such a device mount typically is further secured to a portion of the interior of the vehicle at a position such that the display is visible by the driver. An example of the attachment of such a device mount to the interior of the vehicle is via a suction cup portion to the front windshield.

To increase the portability of such navigation devices it is desirable to reduce or minimize the overall physical size of the device as much as possible. Of course, the reduction of the overall size of such navigation devices has resulted in a similar reduction in the size of the device components, including the display and the controls. While being used as a portable device, the smaller display and controls tend not to be a problem for the user as the portable device is held relatively close and the user can concentrate primarily on the operation and display of the navigation device.

However, when such a portable navigation device is mounted in a vehicle, the smaller display and controls present certain problems for the driver. One such problems includes being difficult to read or otherwise observe the information on the small display of the portable device, especially given that the driver's primary attention and concentration needs to be directed towards the operation of the vehicle and the road ahead, and not on the navigation display. This problem is compounded by the fact that when attached to a device mount, the navigation device is typically held much further away from the user than if it was held in hand in a portable mode.

Another problem of in-vehicle use is that the controls such as keys and touch panel of the portable navigation device are also positioned relatively far away and are small in size. Yet another problem is that the sounds generated by the portable navigation device, such as directional call-outs, street names and the like, may not be heard by the driver especially due to the distant positioning of the navigation device and the effect of other sources of sound, such as the car audio system.

A portable navigation device may be used in a vehicle in conjunction with an external (second) display device such as a head unit of the vehicle audio/video system. The external display device in general has a larger display size compared to the display size of the portable navigation device. Moreover, the external display device may also be positioned in such a way that the user is able to reach and read or observe the information on the display with ease. Thus, it would be advantageous to connect the portable navigation device to the external display. However, an aspect ratio of the external display may be different from that of the portable navigation device.

Therefore, a need exists for a navigation device which includes a removable navigational unit, which while used in the vehicle, provides for an improved operation of the navigation device within the vehicle. Moreover, there is a need for a method and apparatus of image correction to display image effectively to an external display that takes account of the possible display shape and aspect ratio difference.

SUMMARY OF THE INVENTION

It is therefore, an object of the invention to provide a method and system for navigation device with portable navigation unit, and more particularly, to an image correction method and system that converts an image from the portable navigation unit to an external display so as to give aesthetic appearance and map elements that is close to the original image even when the display size, shape and aspect ratio of the external display are different from the display of the portable device.

In at least one embodiment, the present invention is an image correction system which can operate with a navigation system. The navigation system having a portable navigation device, a display screen, controls, at least one speaker, a GPS antenna and a vehicle data generator. The portable navigation device is removable or otherwise detachable from the navigation system and when detached can be operated on its own using a built-in display, controls speaker and GPS antenna. When the portable navigation device is attached to the remaining, fixed or in-vehicle portions of the navigation system then the portable navigation device operates with these components as a complete navigation system. Specifically, when attached to the remainder of the system the portable navigation device switches its display from its integral display to the in-vehicle display screen, its control inputs to the in-vehicle controls, its sound generation to the in-vehicle speakers, and its GPS signal input to the in-vehicle GPS antenna. In addition, the portable navigation device can add an input from the vehicle generator to further facilitate the generation of navigation data.

When used with the in-vehicle components of the navigation system, the in-vehicle functioning of the portable navigation may be improved. Namely, the portable navigation device may be made easier to use and function better in a vehicle, since the in-vehicle display screen can be larger than that of the integral screen, the controls may be bigger and better positioned for the user, the sound can be louder, clearer and easier to control, the GPS signal reception may be improved and the accuracy of the navigation can also be increased.

With some in-vehicle displays and portable displays the aspect ratio of each of the displays is different from the other. For example an in-vehicle display may have an aspect ratio of 16:9 and the portable display is 4:3. Projecting the display of the either to the other, e.g. the image of the portable display to the in-vehicle display will cause a certain amount of distortion of the image.

In embodiments, the present invention provides a system and/or method for correcting the distortion of an image projected to another display having a different aspect ratio. In order to save processing resources, this correction is done only on certain defined image elements that are deemed as being of the greatest or highest importance in providing the best possible final image.

BRIEF DESCRIPTION OF THE DRAWINGS

FIG. 1E is a perspective view showing a front portion of the portable navigation unit which is a main component of the navigation system in accordance with at least one embodiment of the present invention.

FIG. 1F is a perspective view showing a rear portion of the portable navigation unit which is a main component of the navigation system in accordance with at least one embodiment of the present invention.

FIG. 2 is a schematic diagram showing a basic concept of the navigation system in accordance with at least one embodiment of the present invention.

FIG. 3 is a table showing an example of pin assignment for the navigation system in accordance with at least one embodiment of the present invention.

DETAILED DESCRIPTION OF THE PREFERRED EMBODIMENT

In at least one embodiment, the present invention includes a navigation system having both of a portion that is mounted in a vehicle (in-vehicle portion) and a portion that is removable and/or portable (portable navigation unit). The removable portion, i.e, the portable navigation unit, is capable of operating on its own, and separate from the remaining in-vehicle components of the navigation system.

Further, depending on the embodiment, the in-vehicle portion of the navigation system may be capable of operating and performing certain functions on its own separately from the removable portion (portable navigation unit). However, with the removable portion of the system received by and operating with the in-vehicle portion, each portion is capable of operating with additional functionality. Typically, the portable navigation unit has not only a navigation function but other functions, such as a digital audio player, an FM transceiver, etc., as well.

Figure 1A:
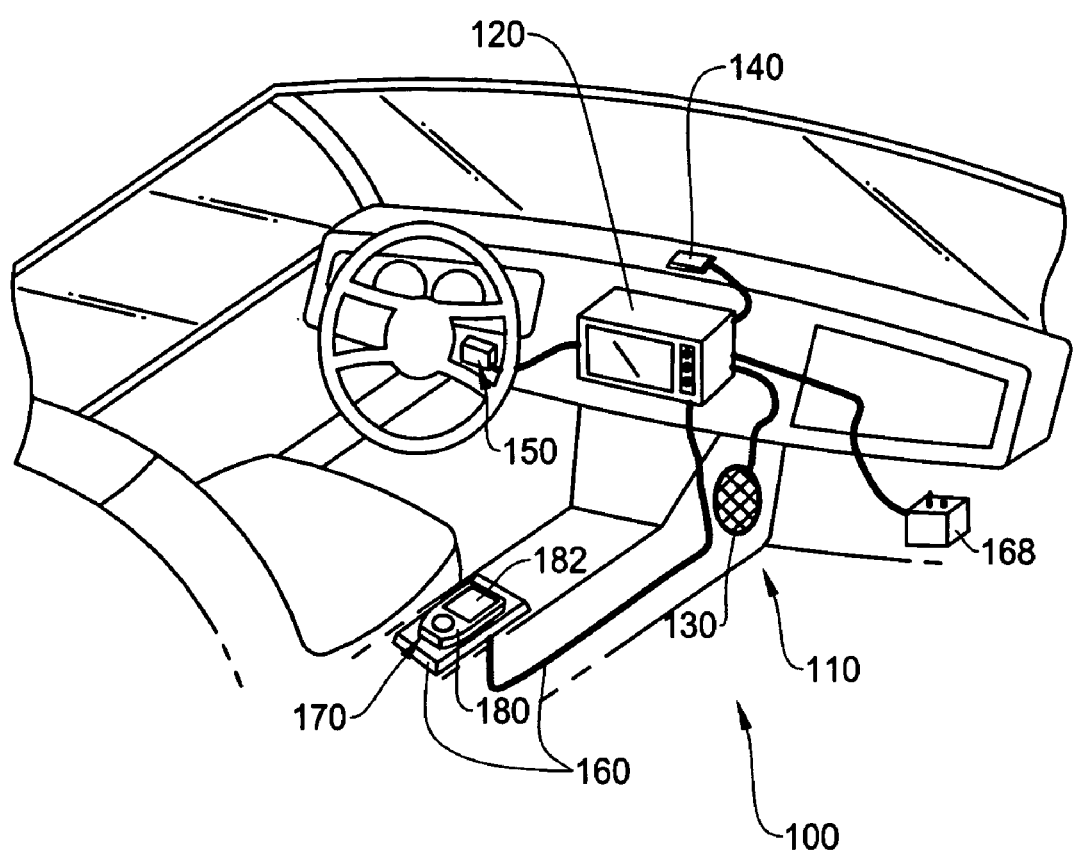
FIG. 1A is a perspective view showing a vehicle interior which includes a navigation system established by a portable navigation unit and in-vehicle components in accordance with at least one embodiment of the present invention.
Figure 1B:
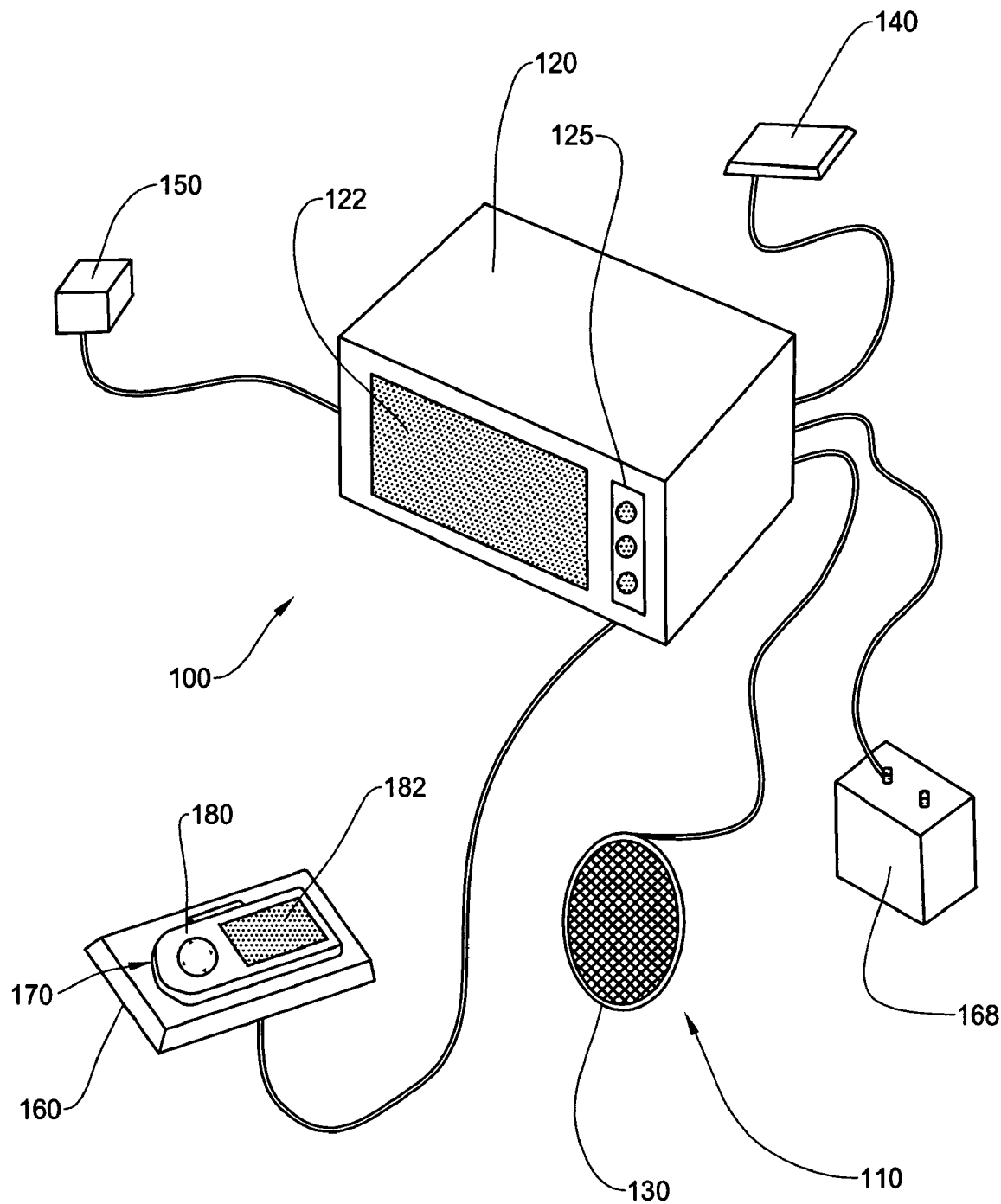
FIG. 1B is a perspective view showing an example of overall structure of the navigation system established by the portable navigation unit and the in-vehicle components in accordance with at least one embodiment of the present invention.

One embodiment is shown in FIGS. 1A and 1B, the navigation system 100 includes an in-vehicle portion 110 (also referred to as "in-vehicle components") and a removable or portable portion 170 (also referred to as a "portable navigation unit"). FIG. 1A shows the embodiment example of the condition wherein the navigation system 100 is installed to a vehicle. Actual placement, shape and size of parts of the navigation system 100 in the vehicle may differ from the view in FIG. 1A when the navigation system 100 is actually applied to a vehicle.

FIG. 1B is a perspective view showing an example of overall structure of the navigation system established by the portable navigation unit and the in-vehicle components in accordance with at least one embodiment of the present invention. In this example, the navigation system 100 is separated from the vehicle to clearly show the overall components associated with the system. The in-vehicle portion 110 includes an in-vehicle display 120 which is typically a head unit of a vehicle audio/video system, speaker or speakers 130, a GPS (navigation) antenna 140, a vehicle data generator 150, a navigation interface 160 and a vehicle power source (battery) 168. The removal portion 170 includes a portable navigation unit 180.

With the navigation system 100, the user can either use the portable navigation unit 180 within the vehicle or away from the vehicle as a portable device (hand-held navigation device, digital audio player, etc). As shown in FIGS. 1E and 1F, the portable navigation unit 180 includes integral components including an interface or connector 181 for electrical connection with a device mount or cradle (not shown), a display 182, controls 184 such as keys and buttons, a speaker 185, a GPS or navigation antenna 186, and a power source (battery) 188. The portable navigation unit 180 has a self-contained operation such that the user can carry and use the unit separately and independently from the rest of the navigation system 100 and the vehicle in which the in-vehicle portion 110 is contained.

The portable navigation unit 180 can be connected to the in-vehicle portion 110 of the navigation system 100 by any of a variety of means. This connection between the portable navigation unit 180 and the in-vehicle portion 110 enables transmitting signals therebetween for communication. These signals can include data such as navigation images, call-outs transmitted from the portable navigation unit 180 to the in-vehicle portion 110 and GPS signals, vehicle information (e.g. speed pulses), control inputs, transmitted from the in-vehicle portion 110 to the portable navigation unit 180.

In some embodiments, the connection includes direct electrical communication between the portable navigation unit 180 and the in-vehicle portion 110. The direct communication can include two or more electrical connectors or pads in direct physical contact, allowing an electrical connection to be made. In the embodiment of FIGS. 1E and 1F, the direct electrical connection to the portable navigation unit 180 can be established through an interface (electrical connector) 181. The interface 181 can be any of a variety of different configurations, including a plug or receptacle, with the in-vehicle portion 110 having a matching cooperating plug or receptacle in the navigation interface 160.

In some embodiments, the connection between the portable navigation unit 180 and the in-vehicle portion 110 is made by means other than a direct electrical connection. For example, the connection can be by wireless means, such as a WiFi, Bluetooth, FM transmission, or the like. Such a wireless communication allows the portable navigation unit 180 to operate with the in-vehicle portion 110 without the need of directly connecting the portable navigation unit 180 to the in-vehicle portion 110, which in turn allow for easier use and less exposed wires in the vehicle.

In some embodiments, the display 182 functions to display the navigational data and information when the portable navigation unit 180 is used in its portable mode of operations. The navigational data can show or display images 183 such as maps, symbols, turn indicators, routes, points of interests or POIs, various icons, and the like. The display 182 can be any of a variety of commercially available display screens including a color LCD device, plasma display device, etc. Many other displays, commercially available or not, can also be used for the display 182.

As the portable navigation unit 180 is connected to, or otherwise in communication with the in-vehicle portion 110 of the navigation system 100, in the embodiments, the portable navigation unit 180 is placed into a mode where the display 182 is turned off. In this mode, the associated data is transmitted to the in-vehicle portion 110 so that the image 183 is reproduced on the in-vehicle display screen 120, as shown in FIGS. 1A and 1B. In this manner, the display 182 can be off when it is not required to show navigation data on the portable navigation unit 180.

In other embodiments of the present invention, the display 182 continues to remain on when the portable navigation unit 180 is connected to the in-vehicle portion 110 of the navigation system 100. Such embodiments may be used to allow other occupants of the vehicle to be able to view the navigation data on the portable navigation unit 180. One example of such an embodiment would include positioning the portable navigation unit 180 connected to the in-vehicle portion so that the rear seat passengers can see the image 183 on the display 182. As noted below with respect to certain embodiments, the display 182 may be a touch screen which has the capability to incorporate some or all of the controls 184.

In the embodiment shown in FIGS. 1E and 1F, the controls 184 are set on the exterior of the portable navigation unit 180 and are generally adjacent to the display 182. The controls 184 allow the user to operate the various functions of the portable navigation unit 180, such as moving through menu screen and selecting items or operations. The specific size, shape, location and operation of the controls 184 can vary depending on the particular embodiment.

As noted above, in some embodiments, some or all of the controls 184 are integrated into the display 182. This integration can be performed by any of a variety of means including using a touch screen for the display 182 with a displayed image which shows a button, switch, slider or other representation of control. This allows the controls displayed to be changed and tailored to the particular condition and operation of the portable navigation unit 180.

Figure 1C:
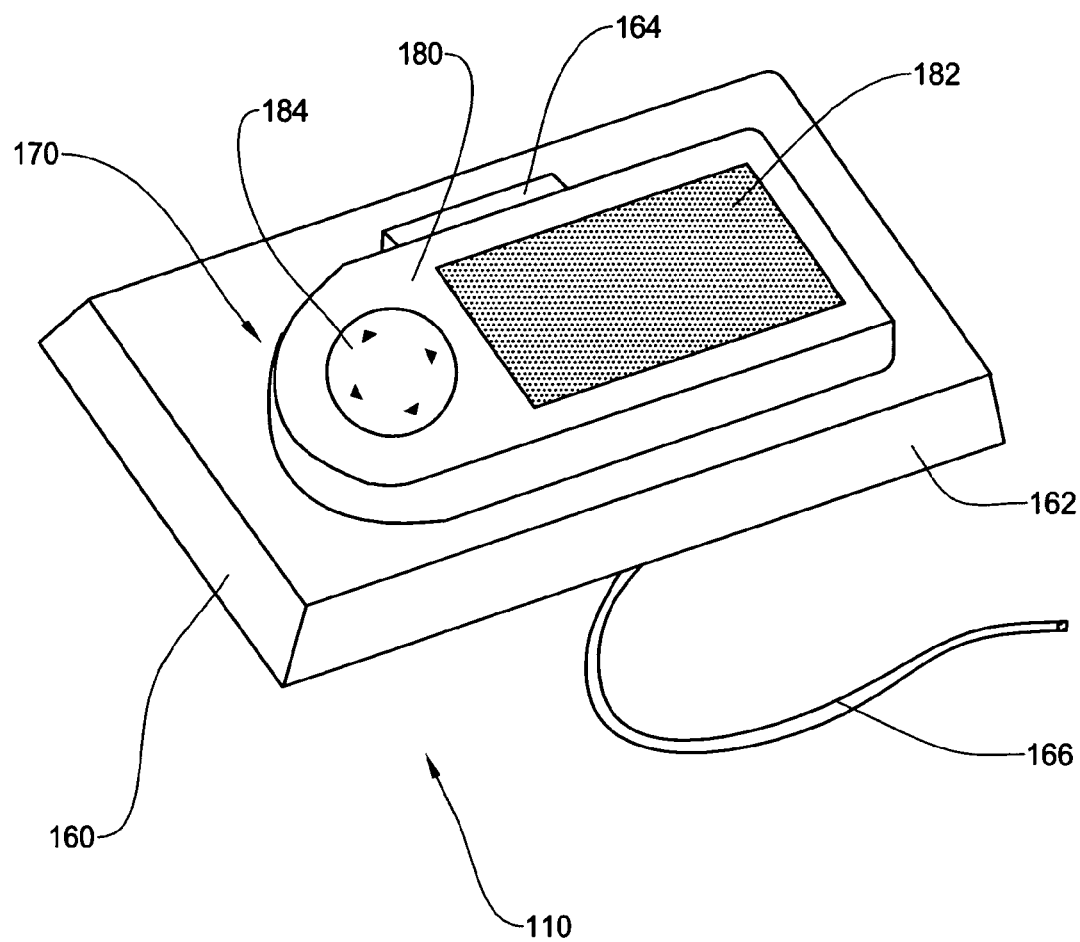
FIG. 1C is a perspective view of a portion of a navigation system including the portable navigation unit and a navigation interface in accordance with at least one embodiment of the present invention.

In some embodiments, the operation of some or all of the controls 184 are disabled when the portable navigation unit 180 is connected to the in-vehicle portion 110 as shown in FIGS. 1A-1C. In this configuration, the portable navigation unit 180 is capable of being controlled by in-vehicle controls incorporated in the in-vehicle portion 110 as further described herein. An example of such in-vehicle controls can include the in-vehicle display 120 having a touch sensitive screen which shows various keys and menu bars and transmits control inputs through the interface 160 to the portable navigation unit 180.

Disabling the controls 184 can protect the operation of the navigation system 100 from an accidental or stray control input being entered directly into the portable navigation unit 180. This aspect can be beneficial if the portable navigation unit 180, when connected to the in-vehicle portion 110, is positioned such that it is easily and/or unintentionally bumped or otherwise contacted by the occupants of the vehicle.

In other embodiments, the operation of some or all of the controls 184 are kept active when the portable navigation unit 180 is connected to the in-vehicle portion 110. This arrangement may be useful to allow a remote vehicle occupant (e.g. the rear seat passenger) to separately operate the navigation system 100.

As shown in FIG. 1F, the speaker 185 can be used to transmit audio information related to the navigation operations of the portable navigation unit 180. This audio information can include call outs for turns, street names, POIs, arrival indications, and the like. The audio information may also include music, songs, dramas, news, etc., when the portable navigation unit 180 is used as a digital audio player or an FM receiver. The use of audio in addition to a visual display can greatly aid the driver and minimize driver distraction.

As shown in FIGS. 1A, 1B and 1F, in some embodiments, when the portable navigation unit 180 is connected to the in-vehicle portion 110, the speaker 185 can be turned off and the sound is sent via the interface 160 to the in-vehicle speakers 130. The use of the larger and sometime higher quality in-vehicle speakers 130 instead of the smaller integral speaker 185, can provide a better and clearer audio presentation for the user.

An additional benefit of using the in-vehicle speakers 130 is that, in some embodiments, the in-vehicle portion 110 of the navigation system 100 can automatically mute or lower the volume of other media being played over the in-vehicle portion 110 (non-essential sound) when a call out or other announcement is made by the navigation system 100. In this way, the user will not miss or not hear a call out by the navigation system 100 while the in-vehicle portion 110 is broadcasting other media (e.g. playing a song).

As shown in FIGS. 1E and 1F, the navigation antenna 186 functions to receive navigation signals transmitted from an external source or sources, such as orbiting satellites. In certain embodiments, the navigation signals received by the navigation antenna 186 are GPS signals and the antenna is a GPS antenna. In other embodiments, the signals received by the navigation antenna 186 also include other information such as traffic reports, weather conditions and the like.

The navigation antenna 186 shown in FIG. 1F is in a closed position where the antenna is folded down while the navigation antenna 186 shown in FIG. 1E is in an open position where the antenna is oriented in a horizontal direction. The navigation antenna 186' shown in the dotted lines of FIG. 1F indicates the antenna in the open position like the antenna 186 shown in FIG. 1E.

When the portable navigation unit 180 is used separately from the in-vehicle portion 110 in a portable mode, the navigation antenna 186 is capable of receiving navigation (GPS) signals. Based on the GPS signals, the portable navigation unit 180 is able to determine the current position of the user as well as other navigation related information (speed, compass heading, etc.). The portable navigation unit 180 is also able to reproduce music or other audible sounds when used as a digital audio player or an FM receiver.

With the portable navigation unit 180 connected to the in-vehicle portion 110, in some embodiments, the integral GPS antenna 186 is no longer used and instead the navigation signals are received by the portable navigation unit 180 via the in-vehicle portion 110. Specifically, as shown in FIGS. 1A and 1B, the navigation signals can be received from the in-vehicle antenna 140 when the portable navigation unit 180 is connected to the in-vehicle portion 110. The navigation signal reception can be greatly improved by using the vehicle mounted antenna 140 instead of the integral antenna 186 because typically the in-vehicle antenna 140 can be formed larger in size using superior components than that of the integral antenna 186.

Another reason is that because metal and other components of the vehicle can block, interfere or otherwise degrade the navigation signal reception within the vehicle, and the in-vehicle antenna 140 can be mounted in a location on the vehicle where this degradation is minimized or non-existent. For example, the in-vehicle antenna 140 can be mounted under the front or rear windshields, or even on the outside of the vehicle on the roof or the trunk. In contrast, for convenience and ease of use, the portable navigation unit 180 will typically be mounted within the interior structure of the vehicle, which can adversely affect its ability to receive the navigation signal.

Other embodiments of the navigation system 100 may use the integral navigation antenna 186 to receive the GPS signals even when the portable navigation unit 180 is connected to the in-vehicle portion 110. Thus, in such embodiments, the in-vehicle antenna 140 can be omitted. This may be done to reduce an overall cost and/or complexity of the navigation system 100.

The power source 188 functions to provide electric power to operate the portable navigation unit 180 separately from any external power source. Depending on the embodiment, the power source 188 can be any of a variety of available batteries or the like. For example the power source 188 can be one or more rechargeable batteries. In some embodiments, when the portable navigation unit 180 is connected to the in-vehicle portion 110, such as that shown in FIGS. 1A, 1B and 1C, the power source 188 is recharged by the vehicle through the interface 140.

As shown in FIGS. 1A and 1B, and as noted above, the in-vehicle portion 110 of the navigation system 100 includes the in-vehicle display 120, the controls 125, the speaker 130, the navigation antenna 140, the vehicle data generator 150, the device interface 160 and the vehicle power source 168. Different embodiments will contain different variations of the above listed items in the particular in-vehicle portion of the navigation system. For example, in some embodiments, only the display 120 is included in the in-vehicle portion 110. In this manner, the user is provided with a larger fixed screen to view the navigation information, but all other operations and functions occur at or within the portable navigation unit 180. In other embodiments, a wireless device interface 160 is provided to transmit a signal to a set of speakers 130 and none of the other components listed above are included.

While the in-vehicle portion 110 of the system can function with the portable navigation unit 180, as noted above, in embodiments, it may also function on its own and separately from the portable navigation unit 180. In this regard, the in-vehicle portion 110 may also include a media or information source 190 which is capable of providing images and/or audio data to the display 120 and the speakers 130, respectfully. This allows the in-vehicle portion 110 to be operated independently of any connection to the portable navigation unit 180.

One example of the media (information) source 190 can be an FM radio which receives traffic incident information, weather forecast, sports and other event information, etc. Another example of the information source 190 can be a trip computer which uses input from the vehicle data generator 150 to calculate trip and status information of a vehicle and present it on the display 120. Many other such configurations of the in-vehicle portion 110 are possible.

Some embodiments of the navigation system 100 may also include a microphone for voice commands. The microphones may be included in either the portable portion 170 or the in-vehicle portion 110. When the portable navigation unit 180 is connected to the in-vehicle portion 110, then either of a microphone on the portable navigation unit 180 or in the in-vehicle portion 110, or the both microphones can be used. The advantages of using an in-vehicle microphone can include an improved quality and an improved sensitivity for a directional microphone to pick up user's voice command.

As shown in FIGS. 1A and 1B, the in-vehicle display 120 can, in embodiments, be a mounted or in-dash display which is positioned to be viewable by the driver. The in-vehicle display 120 can be a flat panel LCD display, a plasma display, a projection display, a CRT, or any other similar such display. While the specific size and shape of the display 120 can vary, to aid the driver in operating the vehicle and to reduce driver distraction, the display 120 is typically significantly larger than the display 182 of the portable navigation unit 180.

Such a larger display allows the driver to obtain more navigational information quickly in an efficient manner than is possible with a smaller display, especially if the smaller display is positioned further away from the driver. In some embodiments, the in-vehicle display 120 also incorporates some or all of the controls 125 through its touch screen as further described below. The display 120 can project an image 122 which can be generated either by an in-vehicle device such as the media source 190 or by the portable navigation unit 180 connected thereto.

In embodiments where the aspect ratio of the in-vehicle display 120 and that of the display 182 of the portable navigation unit 180 differ, either the in-vehicle portion 110 and/or the portable portion 170 may also include a display generator (not shown). Such a display generator can sense or otherwise determine the difference in the aspect ratios and then automatically adjust the image to properly fit the image to the display to which it is projected. In some embodiments only certain elements of the image are resized and/or reshaped for projection on the display having a different aspect ratio. Limiting the reconfiguration of the image to specific elements allows for a reduced use of processing power and thus a quicker image rendering.

Figure 4:
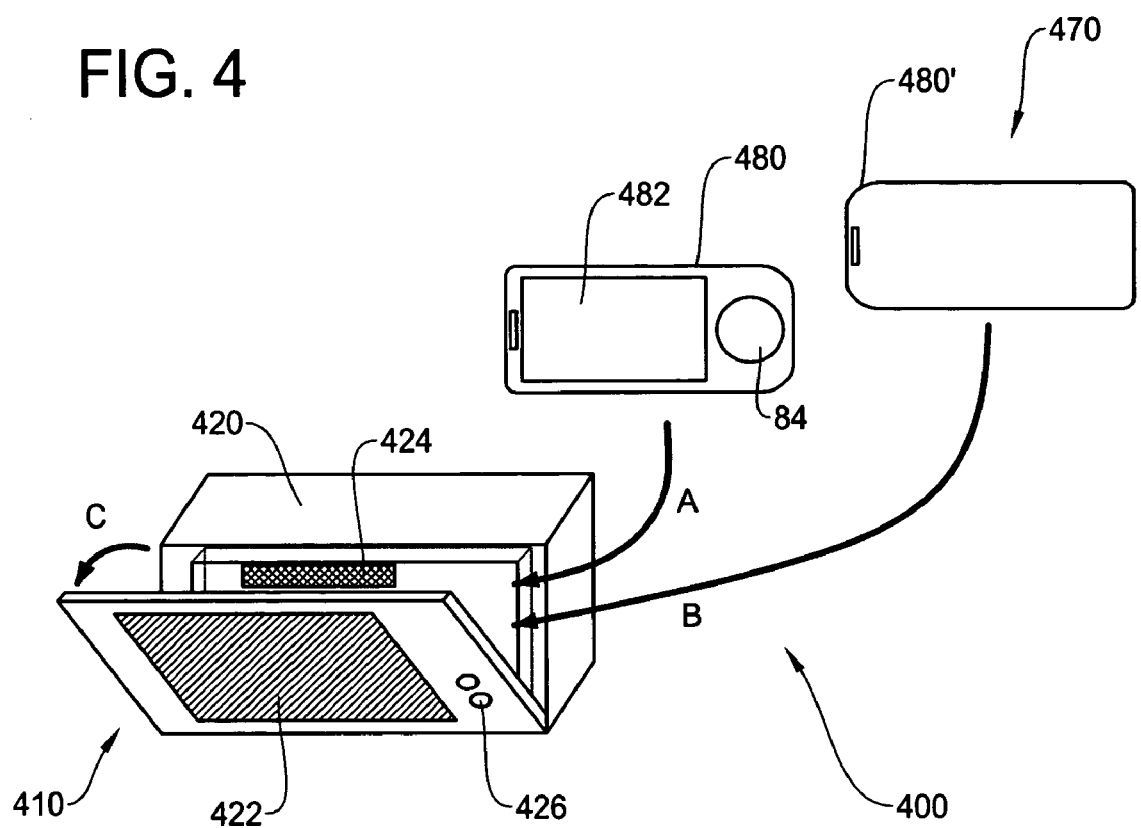
FIG. 4 is a perspective view of a portion of the navigation system including the portable navigation unit and the in-vehicle display in accordance with at least one embodiment of the present invention.

In some embodiments, the determination of the display's aspect ratio is done by a signal sent through the interface 160. Such an embodiment is set forth in FIGS. 3 and 4 showing that a cable has a line and pin dedicated to the status of the display aspect ratio. As shown in FIG. 4, pin No. 11 allows for transmission of the status of the display's aspect ratio. In this case, if the display's aspect ratio is 16:9, a high level signal is sent, and if the aspect ratio is 4:3 a low level signal is sent.

Certain embodiments do not include the in-vehicle display 120 of FIGS. 1A and 1B, and instead use the display 182 of the portable navigation unit 180 to show the navigation information. In such embodiments, the portable navigation unit 180 may be preferably positioned in a location different from that shown to better enable the driver to view the display 182.

Figure 1D:
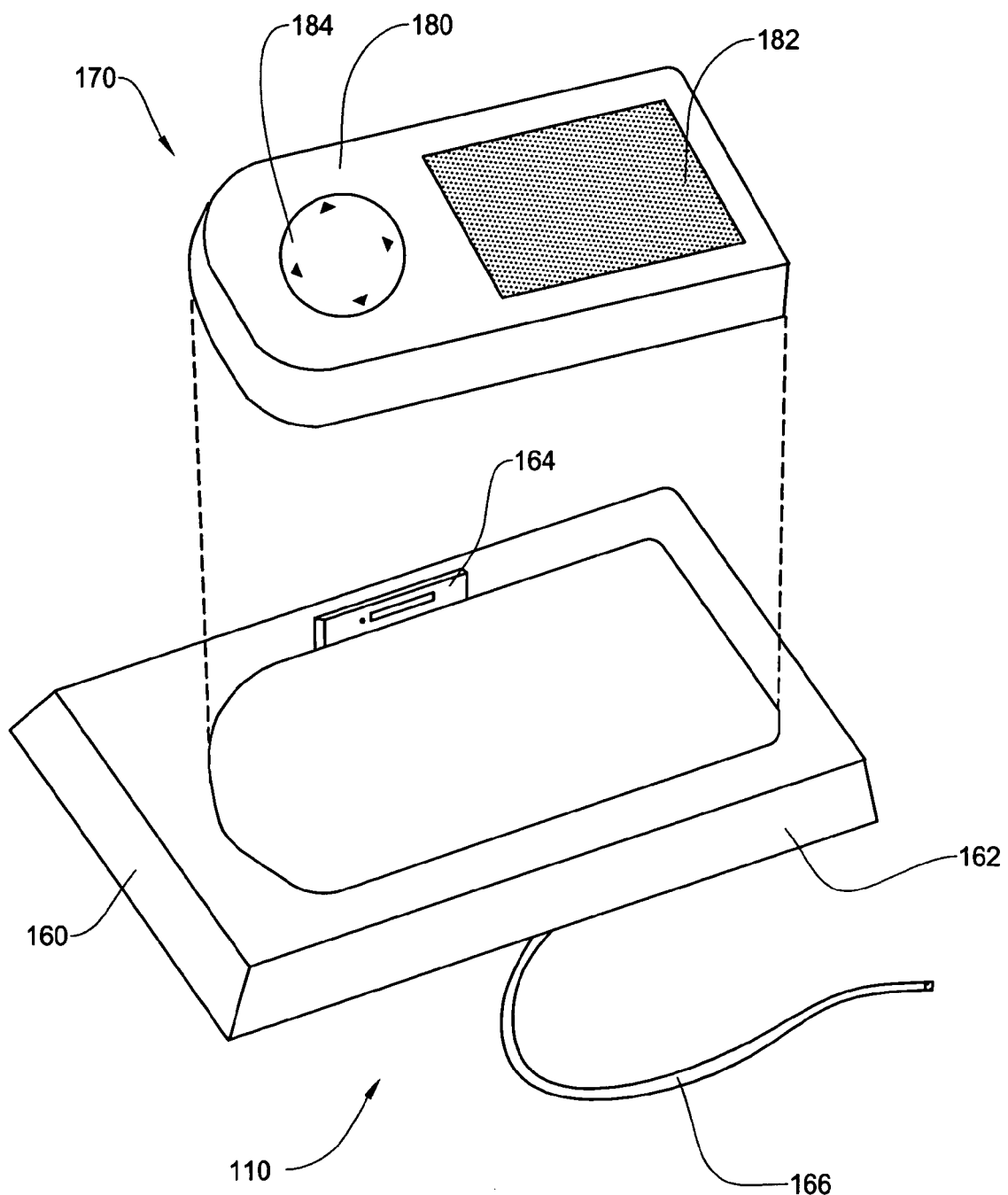
FIG. 1D is a perspective view of a portion of a navigation system including the portable navigation unit and a navigation interface in accordance with at least one embodiment of the present invention.
Figure 1G:
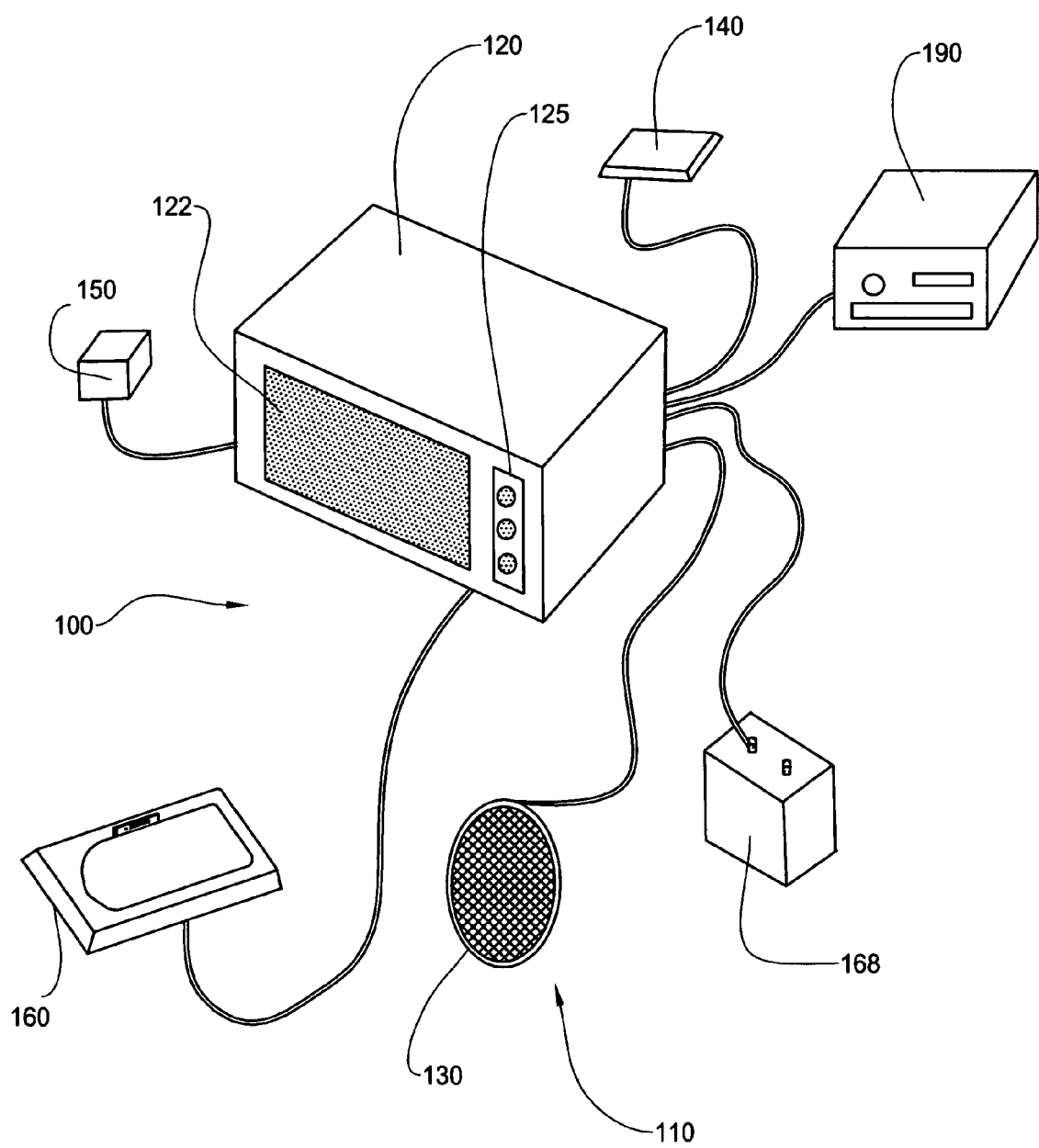
FIG. 1G is a perspective view showing another example of overall structure of the navigation system in accordance with at least one embodiment of the present invention where the portable navigation unit is disconnected.

As shown in FIGS. 1A, 1B and 1G, the in-vehicle controls 125 can function to either control the in-vehicle devices such as a media (information) source 190 and/or to control the operation of the portable navigation unit 180. Using the in-vehicle controls 125 to operate the portable navigation unit 180 instead of the potentially smaller and harder to reach integrated controls 184, it can aid the driver in the operation of the vehicle to reduce the likelihood of driver distraction problems.

Depending on the embodiment, the in-vehicle controls 125 can be physical controls, such as buttons, switches, sliders, etc., and/or virtual controls set forth on a touch sensitive screen or similar display. While the size and positioning of the controls 125 can vary, typically they will be larger than the integrated controls 184 on the portable navigation unit 180 and positioned relatively close to be easily accessible by the driver. The in-vehicle controls 125 can operate the portable navigation unit 180 via a signal transmitted through the interface 160, either by a direct electrical connection or by wireless connection.

In some embodiments, the controls are set in a remote controller (not shown) which transmits a signal to either the in-vehicle portion 110 or directly to the portable navigation unit 180. Certain embodiments can locate the in-vehicle controls 125 in more convenient locations to the driver such as on the steering wheel, or the like. Some embodiments of the navigation system 100 do not include the in-vehicle controls at all.

The in-vehicle speaker 130 can function to transmit or broadcast both sounds generated by in-vehicle devices and sounds generated by the portable navigation unit 180. The sound signals from the portable navigation unit 180 to the in-vehicle portion 110 can be transmitted via the interface 160. The speakers 130 can be one or more speakers of varying size, shape, arrangement, configuration, etc. To improve the quality and/or volume of the sound which the driver hears, in embodiments, the speakers 130 are significantly larger than the integral speaker 185 of the portable navigation unit 180. In addition, the number of speakers 130 can be much greater than that of the portable navigation unit 180. Improving the quality and/or volume of the sound used in navigation can aid the driver's operation of the vehicle and potentially reduce driver distraction. Certain embodiments do not include the in-vehicle speakers 130 and instead utilize the integral speaker 185 as the sole source of sound or have no sound source at all.

The in-vehicle navigation antenna 140 functions to receive navigation signals from external sources. In some embodiments, the antenna 140 is a GPS antenna which receives signals from orbiting GPS satellites. Since the reception of such GPS signals can be adversely affected by obstructions such as the metal bodywork of a vehicle, in some embodiments, the antenna 140 is positioned to have a relatively unobstructed view of the sky. Examples of such positioning can include internal positioning under the front or rear windshield, external positioning on the vehicle's roof or trunk area, or the like.

As noted above, with the integral antenna 186 of the portable navigation unit 180 being positioned within the passenger compartment of the vehicle, improved reception typically will be available from the antenna 140 positioned in the manner noted above. Of course, in certain embodiments the navigation system 100 does not include an in-vehicle antenna 140 and receives the navigation signal from the integral antenna 186 of the portable navigation unit 180.

The in-vehicle data generator 150 functions to provide the navigation system 100 with one or more types of data from the vehicle. The amount and type of data provided can vary by embodiments and can include data which facilitates the navigation functions. For example, the data generator 150 can provide vehicle speed pulse data to be used to determine vehicle speed and distance of travel separately and potentially more accurately than by GPS alone. The data generator 150 can transmit its data to the portable navigation unit 180 via the interface 160.

The interface 160 functions as a connection or data link between the portable navigation unit 180 and the in-vehicle portion 110 of the navigation system 100. As noted above, in some embodiments, the interface 160 can provide two-way communications between the in-vehicle portion 110 and the portable navigation unit 180. Data such as speed pulses, GPS signals, control inputs and the like, can be sent to the portable navigation unit 180 from the in-vehicle portion 110, and data such as the map images, turn indicator images, audio callouts, and the like can be sent to the in-vehicle portion 110 from the portable navigation unit 180 via the interface 160. It should be noted that the specific types of data transferred between the devices can vary depending on the embodiment of the invention.

In at least one embodiment, as shown in FIGS. 1C and 1D, the interface 160 includes a cradle, receptacle, dock or docking station 162 and a cable 166. The cradle 162 functions to receive the portable navigation unit 180 and in so doing make electrical connections between the interface 160 and the portable navigation unit 180. As shown, the cradle 162 also includes a connector 164 which functions to make electrical connections with the connector 181 (FIG. 1F) of the portable navigation unit 180. The connector 164 can be any of a variety of different configurations, including a plug or a receptacle, a USB connector that fits with the connector 181.

The connector 164 on the cradle 162 and the connector 181 (FIG. 1F) of the portable navigation unit 180 can together be any of a variety of cooperating structures, for example an interlocking male-female multi-pin connector. The connector 164 and the connector 181 may be similar to those commonly found on electronic devices such as PDAs, cameras, cell phones and the like. Depending on the embodiment, the particular electrical connections between the connector 164 and the connector 181 can be any of a wide variety. Examples of the connections can include audio, video, power including battery power, AC power for battery charge, audio output, audio mute, illumination inputs, vehicle status inputs, external GPS inputs, car data bus inputs, USB device or other auxiliary or PC device connector, etc.

An embodiment of a navigation system 200 includes a docking station 262 as set forth in FIG. 2, showing the interface 260 including a set or series of connections, including a 13-pin cable 266 connection and an AV Out 267 set between the docking station 262 and a display 220 (via a hide-away box 268), a cable 242 to the in-vehicle GPS antenna 240 and power harness 269. Shown in the table of FIG. 3 is an example of layout and pin assignment of a-13 pin connector with each of its pin and/or lines in the cable identified by pin number, pin name, use, I/O, specification and relevant notes.

Referring back to FIGS. 1A and 1B, in other embodiments, the interface 160 can be a wireless connection between the in-vehicle portion 110 and the portable navigation unit 180. Any known wireless connection can be used including WiFi, Bluetooth, FM transmission, IR (infrared ray) and the like.

The vehicle power source 168 includes a means of delivering power generated by, or otherwise within, the vehicle to each of components of the navigation system 100, including to the portable navigation unit 180 through the interface 160. With the power supplied to the portable navigation unit 180 from an external source, the navigation unit 180 can prevent or limit any loss of charge of its internal or integral power source 188 (FIGS. 1E and 1F). As noted above, the power source 188 may be a battery, and specifically a rechargeable battery. In addition, the external supply of power can be used to recharge the battery 188 as the portable navigation unit 180 is connected to the in-vehicle portion 110. An example of a power connection cable for a docking station embodiment is set forth in the power harness 269 of FIG. 2.

It should be noted that in some embodiments of the system 100, the portable navigation unit 180 can further include components such as a processor, an image display generator or controller, a database, a memory, a system bus, general purpose inputs (such as for push-button switches, trigger switches, etc.) and outputs (e.g. to trigger illumination lights on the device, sound a buzzer or beeper, etc.), audio outputs, video outputs, wireless information transceiver such as two-way (e.g. cellular, WiFi, Bluetooth, infrared ray, etc.) or one-way (e.g. pager, FM RDS receiver, etc.) communication, and the like.

Figure 1H:
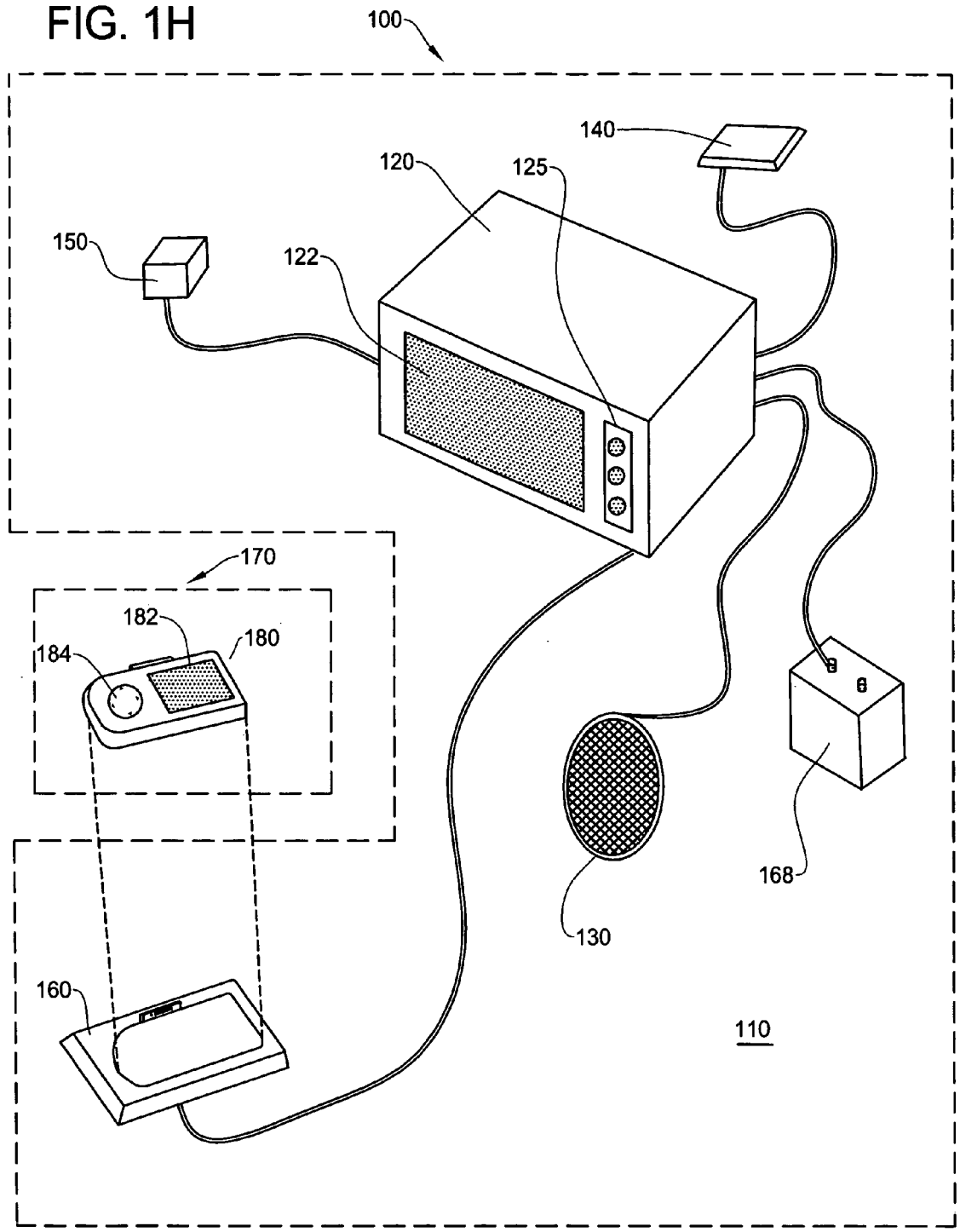
FIG. 1H is a perspective view showing an overall structure of the navigation system in accordance with at least one embodiment of the present invention where the portable navigation unit and the in-vehicle components are illustrated separately.

FIG. 1H is a schematic view showing an example of the components of the navigation system 100. The navigation system 100 is comprised mainly of the in-vehicle portion 110 and the separate removable or portable portion 170. The in-vehicle portion 110 has a plurality of components as described above. The portable portion 170 has the portable navigation unit 180.

In some embodiments of the invention, the portable navigation unit and/or the in-vehicle components can also receive and potentially transmit therebetween, traffic, weather, stock, movies, event information or similar information received from an external source. This external source can transmit its data via radio frequencies, such as by a local FM signal, or from orbiting satellites, or the like. Such transmissions can be received by an additional component in either the portable device and/or the in-vehicle portion of the system. Such traffic information can be displayed on either the portable device display and/or the in-vehicle display.

FIG. 4 shows another embodiment of the present invention. The navigation system 400 includes an in-vehicle portion 410 and a removable or portable portion 470. The in-vehicle portion 410 includes a display unit or head unit 420 having a fold down or rotatable display 422, a receptacle 424, and controls 426. The rotatable display 422 is able to open or close as shown by the arrow C in FIG. 4. The portable portion 470 includes a portable navigation unit 480 having a display 482 and controls 484. The backside 480' of the portable navigation unit 480 is also shown in FIG. 4.

The portable navigation unit 480 can be inserted into and received by the receptacle 424, as shown by the arrow A. Likewise, the portable navigation unit 480 can be inserted into and received by the receptacle 424, with the display 482 facing the inside (backward) of the head unit 420, as shown by the arrow B. With the portable navigation unit 480 received in the display unit 620, the system can function as set forth herein for the navigation system 100, 200 and the like noted above. That is, the navigation system 400 differs from the other systems set forth herein in that the portable navigation unit 480 is received by and retained in the display unit 420.

In embodiments, once the portable navigation unit 480 is received by the display unit 420, the navigation images can be displayed on the rotatable display 422 and the portable navigation unit 480 can be operated by the controls 426. Other in-vehicles components, such as speakers, navigation antenna, microphone and the like, can also be used with the display unit 420 although not shown in FIG. 4.

Another embodiment of the present invention includes a system or method which adjusts certain screen elements to compensate for the difference between aspect ratios of the display of the portable navigation unit and the in-vehicle display. This compensation or correction of image elements (also referred to as "map elements") can be critical for specific applications where the shape of the displayed image carries a certain meaning which would otherwise be lost due to a distortion of the element in a redisplayed image.

For example, in a navigation application, the image of a circle on a map can carry the meaning of a destination point while the image of an oval can a completely different meaning of a highway sign. Obviously, with an uncorrected redisplay of an image of circle as an oval element, the meaning of the circle element is lost and the confusion of the meaning of the oval element will most likely result. The correction of image elements can also provide the benefit of increasing the aesthetics and/or uniformity of the redisplayed image.

Figure 5A:
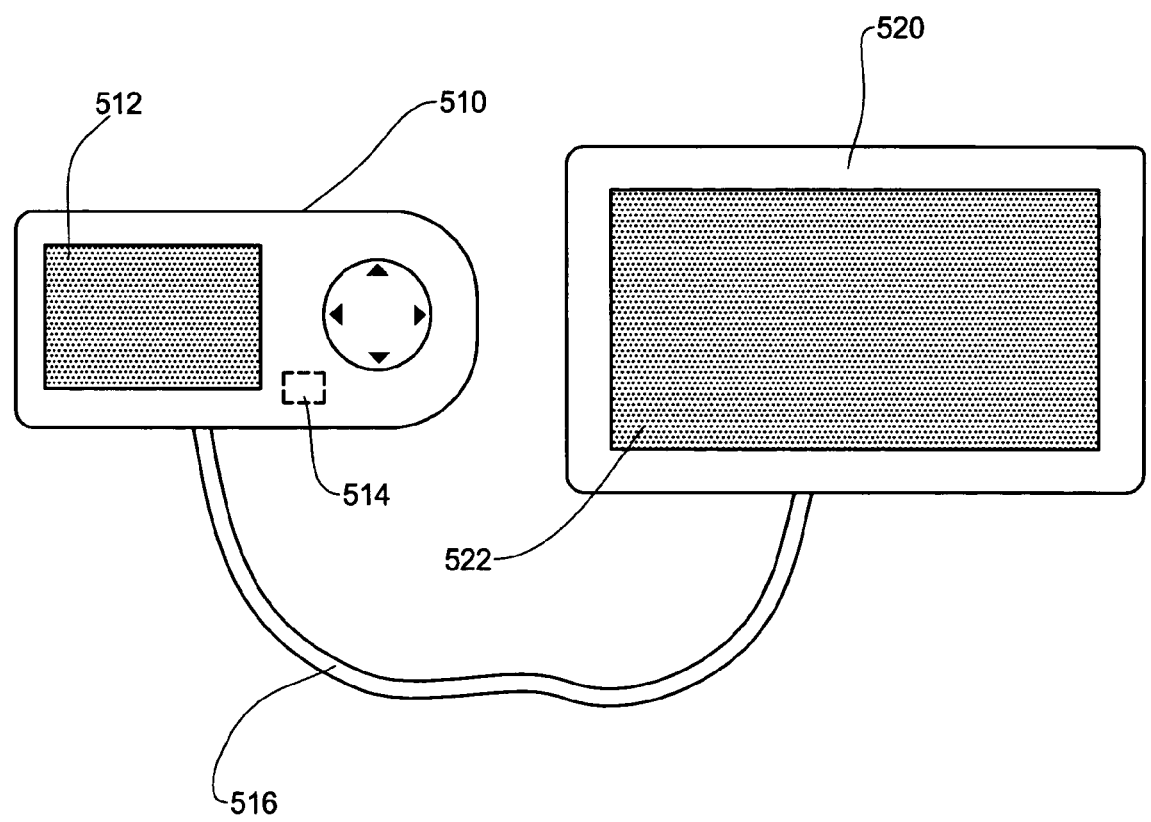
FIG. 5A is a schematic diagram showing a situation where the display of the portable navigation unit and the in-vehicle display have different aspect ratios in accordance with at least one embodiment of the present invention.

As shown in FIG. 5A, in embodiments, an integral display (first display) 512 of a portable navigation unit 510 has a shape and an aspect ratio which is different from the shape and aspect ratio of the display 522 (second display) of an in-vehicle display unit 520. As shown, the display 512 is generally square in shape, for example, having an aspect ratio of 4:3, whereas the display 522 is more elongated horizontally, for example, having an aspect ratio of 16:9 or so. Of course, other differing display shapes may also be used in various other embodiments.

In the embodiments, when the portable navigation unit 510 detects, via an interface cable 516, that the portable navigation unit 510 is connected to the in-vehicle display unit 520, an image controller or generator 514 in the portable navigation unit 510 will redirect the projection of the image from the integral display 512 to the in-vehicle display 522. In some embodiments, the image generator 514 will continue to project an image to the integral display 512 while transmitting and projecting a second image to the in-vehicle display 522.

Figure 5B:
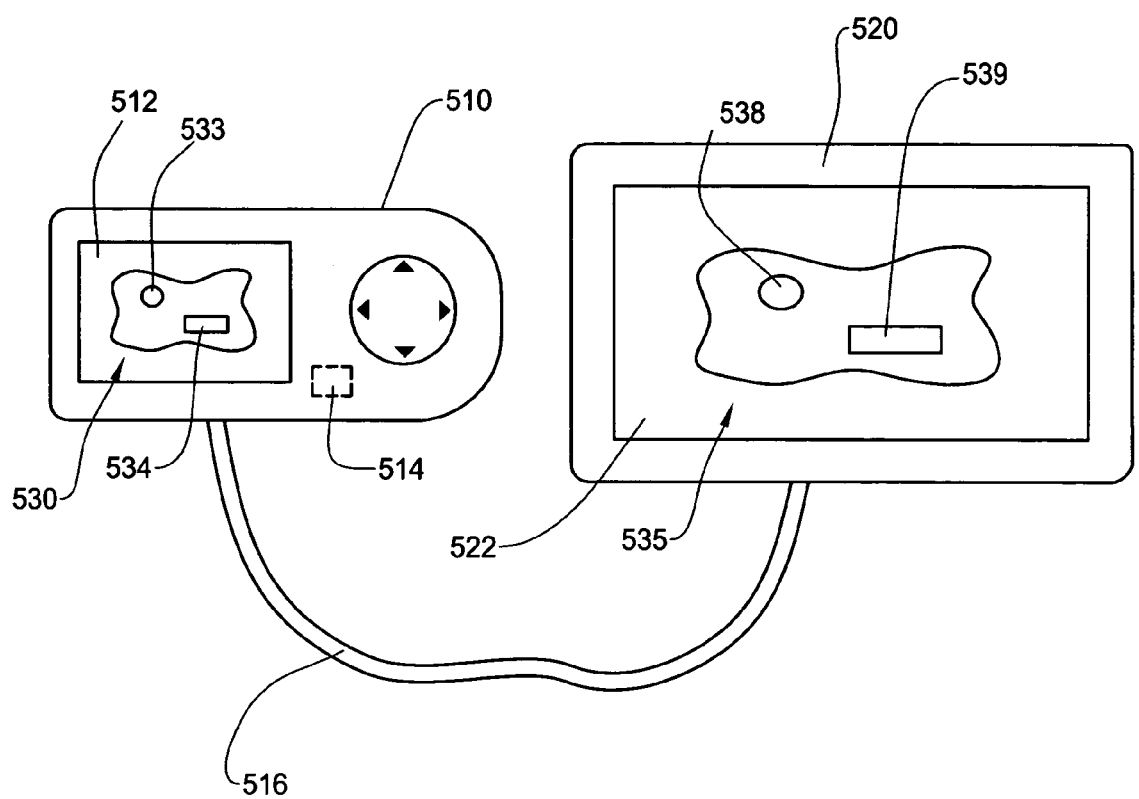
FIG. 5B is a schematic diagram showing a situation where the image data from the portable navigation unit is displayed on the in-vehicle display without compensating difference of aspect ratios.

In at least one embodiment, the image is transmitted to the in-vehicle display 522 without any correction or manipulation. As shown in FIG. 5B, in such embodiments, an image 530 shown on the integral display 512 will result in a deformed image on the in-vehicle display 522 with regard to the aspect ratio. For example, with the image being initially generated for a first display having an aspect ratio of 4:3, redirecting or transmitting the image to a second display having an aspect ratio of 16:9 without correction will result in a new image which has been elongated or stretched along the longer side (horizontal direction in FIG. 5B) of the second display.

As shown, the initial image 530 is projected onto the display 512 of the portable navigation unit 510 and then when connected to the in-vehicle display 522, the redisplayed image 535 is displayed. The original image 530 can include various same elements, symbols, icons, text, fonts or other information and the redisplayed image also contains certain elements, symbols, icons, text, fonts or other information. Depending on the embodiment, the displayed elements, symbols, icons or other information can include navigational or map features, such as roads, intersections, lakes, mountains, points of interests or POIs, turn indicators, control buttons or sliders, as well as textual information such as street names, city names, menu items, and the like.

While in this embodiment, the redisplayed image 535 will still contain all the same elements, symbols, icons, text, fonts, information and the like, as the original display image, the elements, symbols, icons, text, font, information, etc. will be distorted to a certain degree. That is, the aspect ratio of each displayed item will be changed to match or reflect the difference in aspect ratios of the two displays. As shown, the image elements 535 are horizontally elongated relative to the original image 530. For example, a circular element 533 in the original image 530 is shown redisplayed as an oval or elliptical shaped element 538 and a rectangular element 534 is shown redisplayed also as a rectangular element 539 except being longer on the side which has been stretched.

In contrast, in at least one embodiment, the redisplayed image is processed so that every redisplayed element, symbol, icon, text, font or the like is reshaped so that each item retains its original aspect ratio and/or shape. However, while doing an all inclusive correction provides an improved image, depending on the processing power and speed of the portable device, the speed of the image rendering can be adversely affected.

To provide sufficiently fast image rendering and to save a graphics storage space, while retaining a desired image quality, embodiments of the present invention perform image correction on only certain selected elements, symbols, icons, text, fonts or other information. The selection of which items to correct and which items not to correct can vary depending on any of a variety of factors including the amount and type of distortion of uncorrected items, the assigned or inherent meaning of the shape of the items, the processing power of the device creating the image, the importance of the item relative to other displayed items, the function of the displayed image, and the like.

Figure 5C:
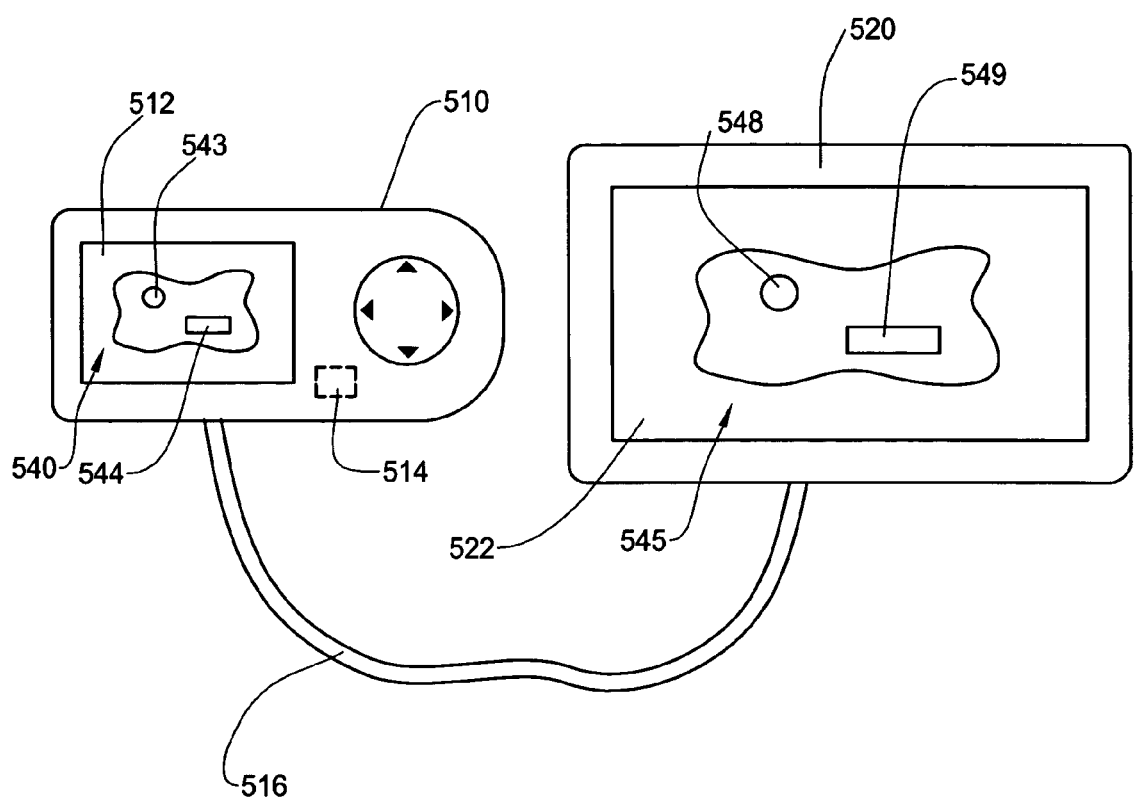
FIG. 5C is a schematic diagram showing a situation where the image data from the portable navigation unit is displayed on the in-vehicle display while shapes of selected elements on the image are corrected to compensate the difference of aspect ratios.

An embodiment shown in FIG. 5C is a set of displays of different aspect ratios, where the integral display 512 has an image 540 which is partially corrected and transferred to the in-vehicle display 522 having an image 545. The image 540 can display any of a variety of elements, symbols, icons, text, font or other information, however, for clarity, a simple image 540 is shown. The image 540 has items including a circular shaped element 543 and a rectangular shaped element 544. In this example, the image 540 is transferred to, and redisplayed on the in-vehicle display 522 as a partially corrected image.

As shown, the image 545 has items including a corrected circular shaped element 548 and an uncorrected or elongated rectangular shaped element 549. In this embodiment, the image of the circular shaped element 543 was selectively corrected such that the redisplayed image element 548 would remain circular in shape. In contrast, the rectangular shaped element 544 was selectively not corrected such that the redisplayed image element 549 was still a rectangular shaped element, although elongated and/or stretched.

Selectively choosing the circular element to correct and not correct the rectangular element allows the circular element to retain its meaning as a circle and not be viewed as an oval, which may have a separate meaning, while reducing processing time by not correcting the rectangular element which in the redisplay maintains any meaning assigned as it is still a rectangle.

In at least one embodiment of the present invention, the image that is produced by the portable navigation unit is comprised of map images rendered from a navigation database and a separate set of image elements referenced by one or more look-up tables. The image elements can include points of interests, street names, city names, destination markers, turn and route indicators and the like. As the complete image is created, the map image is rendered with the image elements laid over the map image.

In such embodiments, to facilitate the correction of the images between the portable display and the in-vehicle display, the image generator or operating system chooses not to correct the map image and to correct some or all of the image elements. In at least one embodiment, the choice of which elements to correct and the correction of the image elements can be accomplished by means of a corrected element look-up table. This corrected element look-up table can be substituted for the original or uncorrected look-up table upon the detection of the connection with the in-vehicle display. Within the corrected image table, all or only selected elements can have a different shape or form from their original shape or form.

When viewed on the in-vehicle display, the corrected images may retain their aspect ratios to the display of their uncorrected images on the first or original display. Of course, if the corrected images are displayed on the first or original display, they will be accordingly distorted, compressed or compacted. For example, a corrected rectangle if displayed on the original display could be shown as a square shaped image.

Figure 6:
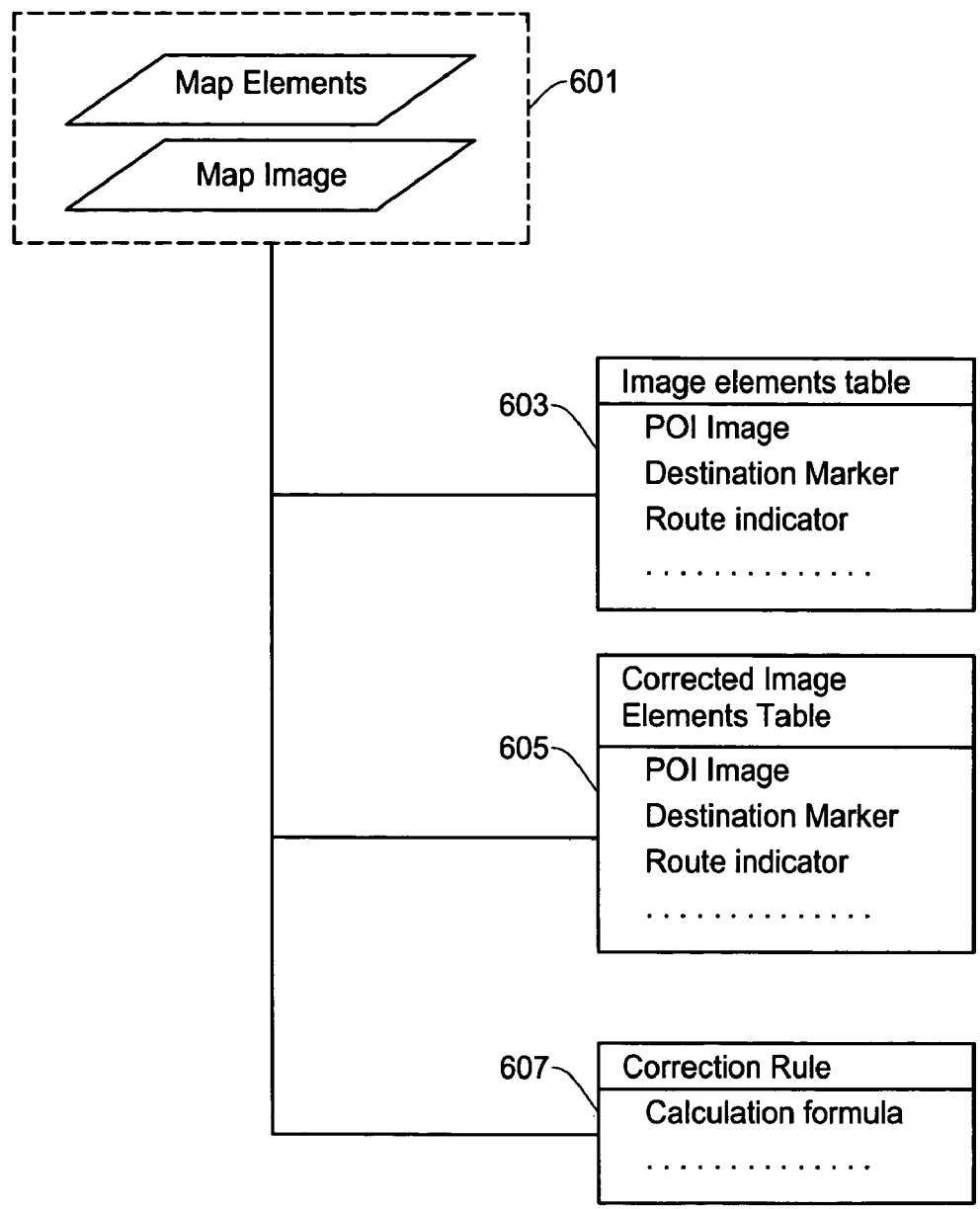
FIG. 6 is a schematic block diagram showing the data table and correction rule for selectively correcting the elements in the map data for the case of FIG. 5C.

FIG. 6 is a schematic block diagram showing the data tables and correction rules for map data in converting the map data for the external (in-vehicle or second) display. As shown, the map data 601 has various map elements and their images. In the case where changes in the aspect ratio are required for displaying the map image to the external display such as an in-vehicle display, the aspect ratio of map image in the map data is changed to an appropriate aspect ratio according to the correction rule 607.

The correction rule 607 in FIG. 6 is a set of formulas to be used to correct the map image and some map elements for viewing in the external display. Generally, the image elements table 603 is used to display such map elements on the display of the portable navigation unit. In the case where the in-vehicle display is used, the corrected image elements table 605, which stores images for different aspect ratios, is used to display an image on the in-vehicle display. Some map elements such as the rectangular shape noted above may be drawn without using the corrected image elements table but by the correction rule 607.

Figure 7:
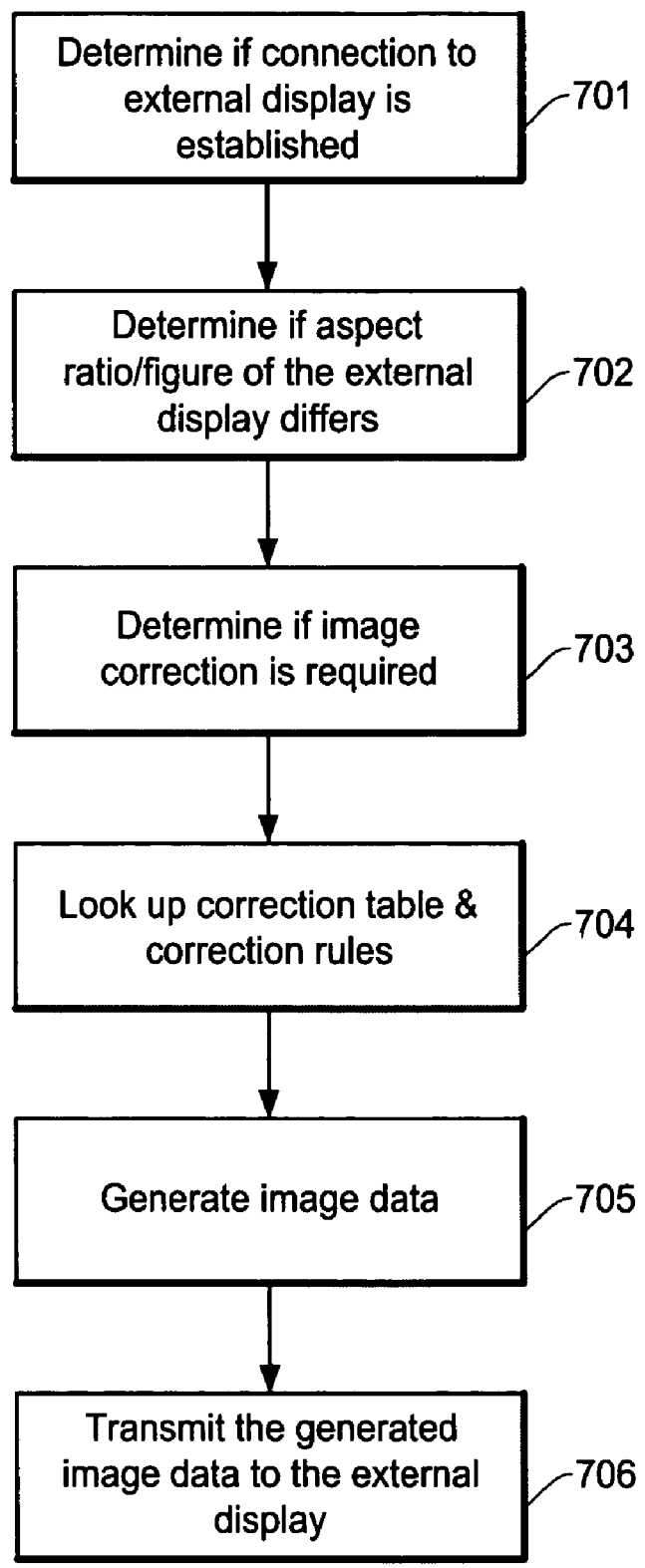
FIG. 7 is a flow chart showing an example of basic operational steps of the present invention for displaying an image on the in-vehicle display based on the image data from the portable navigation unit.

FIG. 7 is a flow chart showing the steps of displaying an image to the external (in-vehicle) display such as shown in FIG. 5C with image correction for aesthetic appearance and ease of viewing or correctly recognizing map elements. First, whether the portable navigation unit is connected to an external display is determined in the step 701. If it is established that the external display has been connected to the portable navigation unit, it will be determined whether the aspect ratio and shape of the display of the external display in the step 702.

Next, it is determined whether the image correction as described above with reference to FIGS. 5B and 5C is needed in the step 703. Several factors may be taken into consideration as noted above. If the difference between the aspect ratios of the portable display and the external display is minimum, the image correction may not be performed. Even when there is some differences in the aspect ratio between those two displays, the portable navigation unit may be set not to generate corrected images in order to save computational resources. The user may also set his/her preference as to whether the image correction is to be performed.

If the image correction is deemed necessary, in the step 704, the portable navigation unit will check the correction table to determine which elements are to be corrected for the external display. The pre-compiled image that has been stored in the image correction table such as shown in FIG. 6 may be used for generating corrected image data. The navigation system may also use correction rules to calculate and generate an image to be displayed.

Based on the images stored in the map database and the correction table, an image for the external display is generated in the step 705. Finally, the portable navigation unit will transmit the generated image data to the external display so that the external display can display the corrected image in the step 706.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation system for displaying a map for guiding a user to a destination, comprising:
   a first display provided on a removable navigational unit;
   a second display provided on an in-vehicle portion within a vehicle, the second display having an aspect ratio different from that of the first display;
   a navigation interface which electrically connects the removable navigation unit with the in-vehicle portion;
   an image controller which generates both a first image for projection on the first display and a second image for projection on the second display where each of the first and second images has a plurality of image elements; and
   a data table which stores data indicating a plurality of image elements, corrected image elements for different aspect ratios, and correction rules for correcting an aspect ratio of the image element;
   wherein the image controller selects an image element and creates corrected image element data for the selected image element based on the correction rules in the data table for projection on the second display such that the image of only the selected image element has a substantially common aspect ratio on each of the first display and the second display even though the aspect ratios of the first and second displays are different from one another and wherein an unselected image element is projected without modification on the second display.

2. A navigation system as defined in claim 1, wherein the first display has a first aspect ratio and the second display has a second aspect ratio, and wherein the image controller of the removable navigation unit detects a difference between the first aspect ratio and the second aspect ratio when the first display is connected to the in-vehicle portion and determines whether image correction is necessary based on the difference between first aspect ratio and the second aspect ratio.

3. A navigation system as defined in claim 1, wherein said correction rule is an image correction rule algorithm that performs calculation to generate the corrected image element data to display the selected image element on the second display when there is a difference between the first aspect ratio and the second aspect ratio.

4. A navigation system as defined in claim 3, wherein the image data for displaying the image on the first and second displays is comprised of map element data and map image data, and map element data are extracted for image correction to have substantially common aspect ratio on each of the first display and the second display when displayed on the second display.

5. A navigation system as defined in claim 1, wherein the navigation interface establishes communication between the removable navigation unit and the in-vehicle portion when the removable navigation unit is mounted on the navigation interface where the interface includes a connector to transmits electrical signals and power between the removable navigation unit and the in-vehicle portion.

6. A navigation system as defined in claim 5, wherein the removable navigation unit includes an integral speaker and the in-vehicle portion includes an in-vehicle speaker, and when mounted on the navigation interface, the removable navigation unit disables the integral speaker and activates the in-vehicle display to use only the in-vehicle speaker for performing the navigation functions.

7. A navigation system as defined in claim 5, wherein the removable navigation unit controls relative volume of sounds that are reproduced by the in-vehicle speaker such that the volume of navigational sounds is greater than that of non-navigational sounds.

8. A navigation system as defined in claim 5, wherein the removable navigation unit includes an integral antenna and the in-vehicle portion includes an in-vehicle antenna, and when mounted on the navigation interface, the removable navigation unit disables the integral antenna and activates the in-vehicle antenna to use only the in-vehicle antenna for performing the navigation functions.

9. A navigation system as defined in claim 5, wherein the removable navigation unit includes an integral antenna and the in-vehicle portion includes an in-vehicle antenna, and when mounted on the navigation interface, the removable navigation unit activates both the integral antenna and the in-vehicle antenna for performing the navigation functions.

10. A navigation system as defined in claim 5, wherein the removable navigation unit includes integral controls and the in-vehicle portion includes in-vehicle controls, and when mounted on the navigation interface, the removable navigation unit disables the integral controls and activates the in-vehicle controls to use only the in-vehicle controls for performing the navigation functions.

11. A navigation system as defined in claim 5, wherein the removable navigation unit includes integral controls and the in-vehicle portion includes in-vehicle controls, and when mounted on the navigation interface, the removable navigation unit activates both the integral controls and the in-vehicle controls for performing the navigation functions.

12. A navigation system as defined in claim 1, wherein, when the removable navigation unit is mounted, the navigation interface sends signals and data to components in the in-vehicle portion and receives signals and data from the components in the in-vehicle portion through either wired communication or wireless communication.

13. A method for generating a corrected image for a navigation system, comprising the following steps of:
connecting a first display and a second display each having an aspect ratio different from one another;
retrieving image data for the first display;
determining a difference between the aspect ratio of the first display and the aspect ratio of the second display;
determining which image element should be displayed with substantially the same aspect ratio on each of the first display and the second display;
selecting an image element from a plurality of image elements that configure a first image displayed on the first display based on the determination step so that only the selected image element is corrected in its aspect ratio when displayed on the second display;
checking a correction table to extract corrected image element data for only the selected image element by applying a correction rule based on a difference between the first and second display, where the correction table stores corrected image element data to be used as the selected image element; and
generating the corrected image element data extracted from the correction table for displaying a second image of the selected image element on the second display so that only the selected image element has a substantially common aspect ratio on each of the first display and the second display even though the aspect ratios of the first and second displays are different from one another where an unselected element is projected without modification on the second display.

14. A method for generating a corrected image as defined in claim 13, wherein the first display is provided to a removable navigation unit and the second display is provided to an in-vehicle portion of a vehicle.

15. A method for generating a corrected image as defined in claim 14, further comprising a step of determining whether the first display and the second display are electrically connected through an navigation interface.

16. A method of generating a corrected image as defined in claim 15, further comprising a step of checking correction rules to perform calculation for generating the corrected image element data for the selected element.

17. A navigation system as defined in claim 1, wherein the image controller selects an image element based on amount of distortion of the image element.

* * * * *